(12) United States Patent
Creek

(10) Patent No.: US 9,017,175 B2  
(45) Date of Patent: Apr. 28, 2015

(54) PROPSHAFT ASSEMBLY

(71) Applicant: GM Global Technology Operations LLC, Detroit, MI (US)

(72) Inventor: Steven W. Creek, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/939,266

(22) Filed: Jul. 11, 2013

(65) Prior Publication Data

US 2015/0018105 A1  Jan. 15, 2015

(51) Int. Cl.
F16D 3/12  (2006.01)
F16C 3/02  (2006.01)

(52) U.S. Cl.
CPC .................................... F16C 3/02 (2013.01)

(58) Field of Classification Search
USPC ............ 464/89, 127, 180; 74/574.4; 180/381; 188/378–380
See application file for complete search history.

(56) References Cited

U.S. PATENT DOCUMENTS

| 2,961,894 | A | * | 11/1960 | Oles | 74/574.4 |
|---|---|---|---|---|---|
| 3,670,593 | A | * | 6/1972 | Troyer | 74/574.4 |
| 5,145,025 | A | * | 9/1992 | Damian | 180/381 |
| 5,299,468 | A | * | 4/1994 | Withers | 74/574.4 |
| 6,216,327 | B1 | * | 4/2001 | Hendrian | |
| 7,178,423 | B2 | * | 2/2007 | Breese et al. | 74/574.4 |
| 7,197,959 | B2 | * | 4/2007 | Crissy | 74/574.4 |

* cited by examiner

Primary Examiner — Gregory Binda
(74) Attorney, Agent, or Firm — Quinn Law Group, PLLC

(57) ABSTRACT

A propshaft assembly includes an axle flange, a propshaft, and a damper. The propshaft includes a prop flange, which may be mated to the axle flange for common rotation therewith. The damper includes an outer mass that annularly surrounds the prop flange. The damper is press-fit onto one of the prop flange and a flange pilot, such that the damper is attached directly to the propshaft without fasteners.

10 Claims, 2 Drawing Sheets

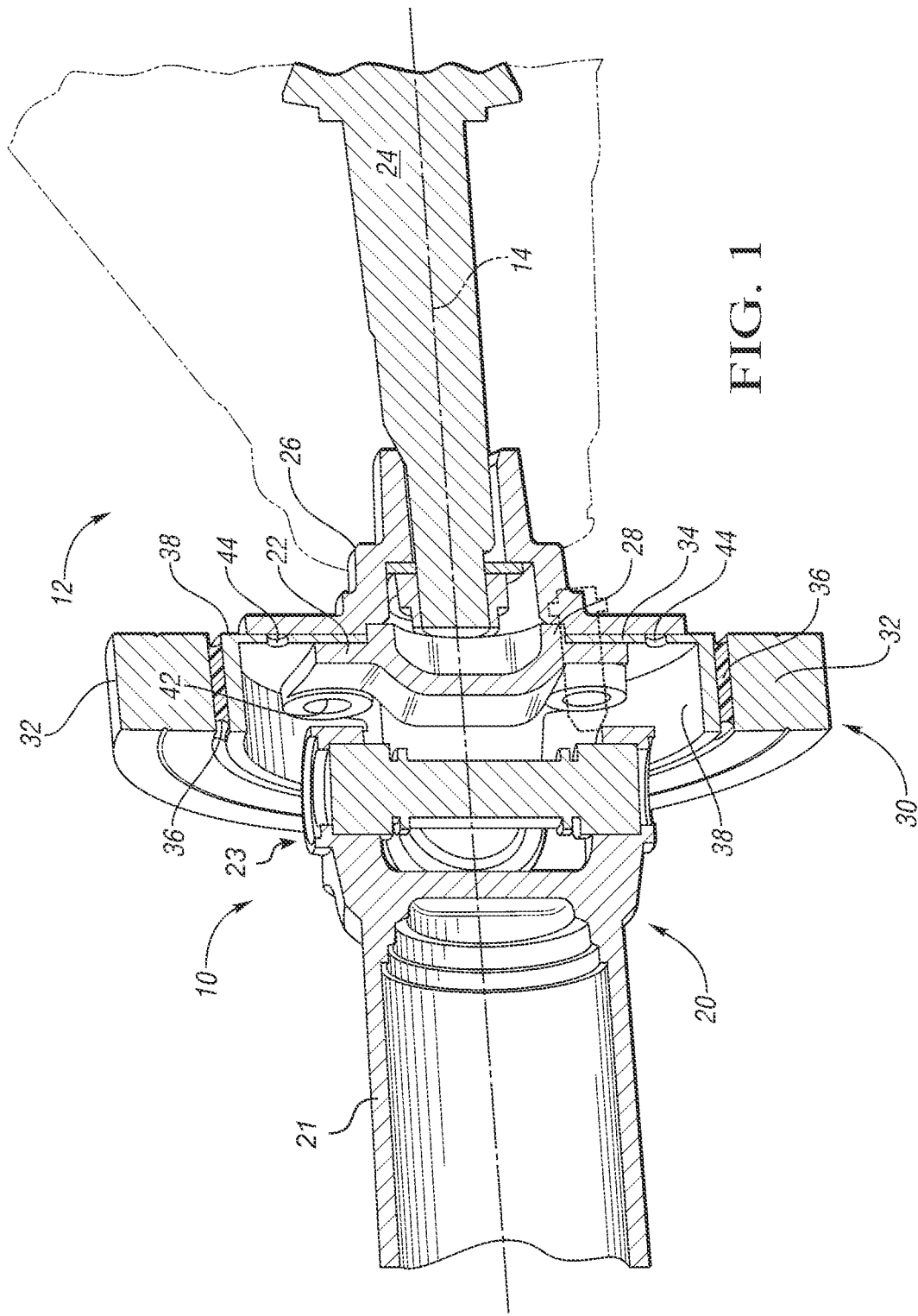

PROPSHAFT ASSEMBLY

TECHNICAL FIELD

This disclosure relates to propshafts, propshaft assemblies, and vibration thereof.

BACKGROUND

A drive shaft, propeller shaft, or propshaft may carry torque and power from a prime mover or transmission to an output device, such as a propeller or one or more wheels. Propshafts may transmit the drive force generated by the engine to one or more axles or a transfer case.

SUMMARY

A propshaft assembly is provided. The propshaft assembly includes an axle flange, a propshaft, and a damper. The propshaft includes a prop flange, which may be mated to the axle flange for common rotation therewith.

The damper includes an outer mass that annularly surrounds the prop flange. The damper is press-fit onto one of the prop flange and a flange pilot, such that the damper is attached directly to the propshaft without fasteners. The propshaft and the damper may be balanced as an assembled component before mating the axle flange to the prop flange.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 1 is a schematic, sectional, isometric view of a propshaft assembly having a damper pressed directly onto a propshaft;

DETAILED DESCRIPTION

Figure 3:
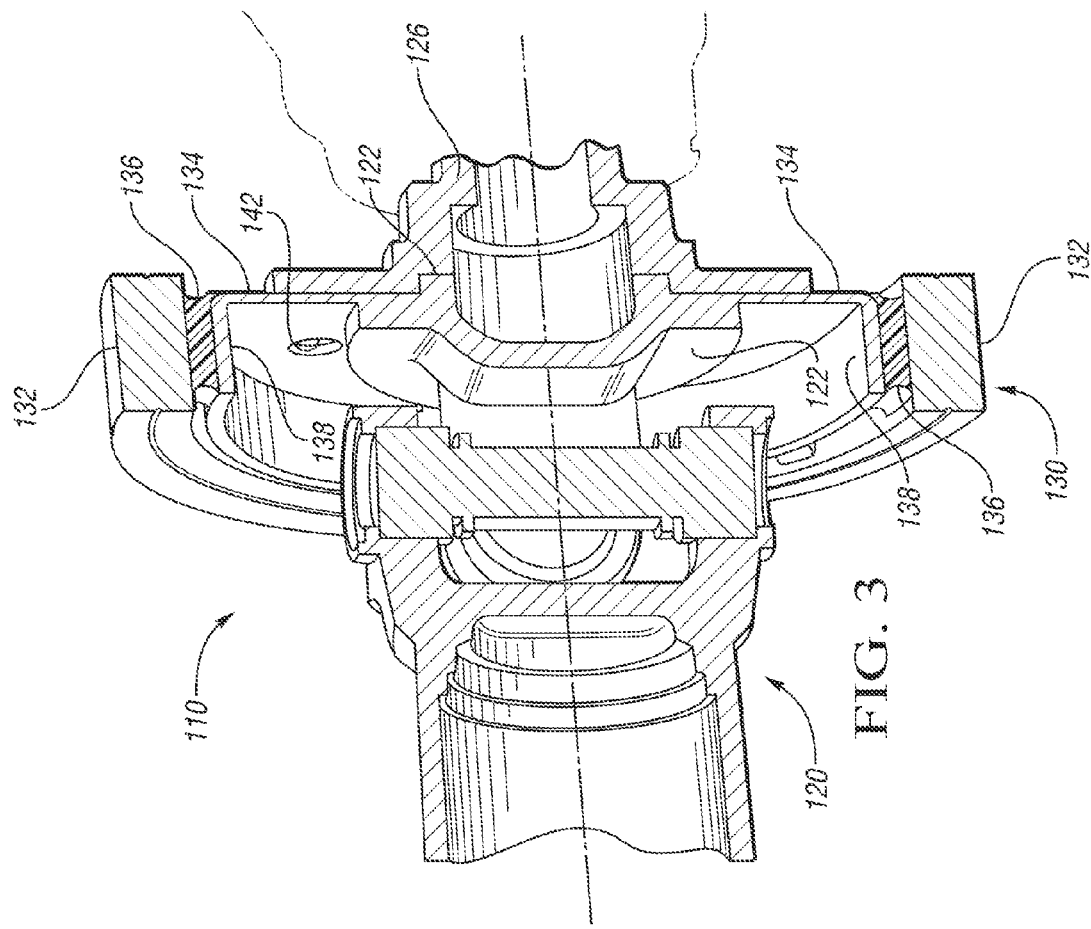
FIG. 3 is a schematic, sectional, isometric view of a propshaft assembly having a damper pressed onto an integrated flange of the propshaft.

Referring to the drawings, like reference numbers correspond to like or similar components wherever possible throughout the several figures. FIG. 1 shows a cross-sectional view of a propshaft assembly 10 for transferring rotation to an output assembly 12. The propshaft assembly 10 and the output assembly 12 may be used within a vehicle (not shown). The output assembly 12 rotates about an axis 14, which may represent a longitudinal axis in cylindrical coordinate systems. Some vehicles may include multiple sets of the propshaft assembly 10, the output assembly 12, or both.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

The view of FIG. 1 schematically illustrates one configuration of the propshaft assembly 10 and the output assembly 12. However, components shown in FIG. 1 may be altered, depending upon the vehicle.

As shown in FIG. 1, the propshaft assembly 10 includes a propshaft 20 having an input shaft 21 rotating a prop flange 22. In the exemplary arrangement shown, the propshaft assembly 10 has a universal joint 23 between the input shaft 21 of the propshaft 20 and the prop flange 22, such that there may be an offset angle between the propshaft 20 and the axis 14. The prop flange 22 may be considered a portion or component of the propshaft 20, and the two may be assembled together as one part. Therefore, reference to the propshaft 20 may include the input shaft 21, the prop flange 22, the universal joint 23, or other components there between that may be assembled together as one part. The propshaft 20 drives the prop flange 22 for common, although not necessarily axially-aligned, rotation therebetween.

The output assembly 12 includes an output member 24, which may be an axle, a half-shaft, or another rotatable shaft. The output member 24 rotates about the axis 14. The output member 24 is attached to, and driven by, an axle flange 26, which is fixedly attached or mated to the prop flange 22 for common rotation therewith.

Note that the terminology of "output" versus "input," particularly when referring to the output assembly 12, is illustrative only and is not limiting. In fact, the output assembly 12 shown may act as the input to the propshaft assembly 10 under some circumstances. Furthermore, similar structures may be attached to the opposite side of the propshaft 20, which may be receiving torque and power from an engine or transmission (not shown).

A flange pilot 28 is formed on the prop flange 22 and is configured to align the prop flange 22 to the axle flange 26. The components of the flange pilot 28 may assist during assembly and mating of the axle flange 26 to the prop flange 22, or the reverse.

The propshaft assembly 10 further includes a damper 30 disposed in line with, or substantially around, the propshaft 20. The damper 30 may be incorporated into the propshaft assembly 10 to reduce torsional or angular vibration of the propshaft assembly 10, the output assembly 12, or both.

Figure 2:
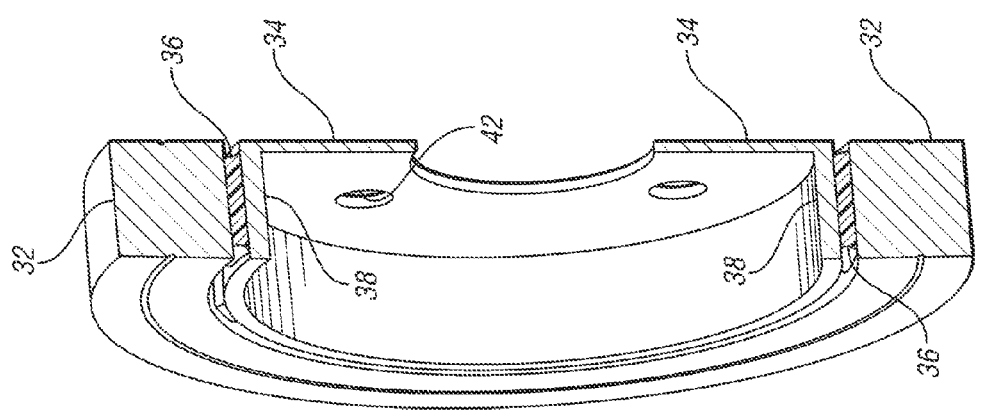
FIG. 2 is a schematic, sectional, isometric view of the damper of the propshaft assembly of FIG. 1.

Referring also to FIG. 2, and with continued reference to FIG. 1, there is shown a cross-sectional view isolating the damper 30 of the propshaft assembly 10 of FIG. 1. The damper 30 includes an outer mass 32 and a hub or inner hub 34. The outter mass 32 annularly surrounds the prop flange 22. The inner hub 34 is pressed or press-fit onto either the prop flange 22 itself or the flange pilot 28. Therefore, the damper 30 is attached directly to the propshaft 20 via friction and interference such that there is common rotation (and also axial movement) between the two. There are no fasteners or other components holding the damper 30 to the prop flange 22. However, fasteners, such as bolts, may be used to attach the axle flange 26 to the already-assembled damper 30 and prop flange 22.

At minimum, the inner hub 34 is attached to the prop flange 22 with sufficient retention force and torque that the damper 30 may be attached to the propshaft assembly 10 prior to assembly of the output assembly 12 and the propshaft assembly 10 may be tested and balanced with the damper 30 attached. Testing and balancing of the propshaft 20 with the damper 30 attached better identifies and reduces vibration in the propshaft assembly 10. Furthermore, the propshaft assembly 10 may be fully assembled and moved, or shipped, as a unit prior to mating to the output assembly 12. This removes one loose component, the damper 30, from the final assembly process.

The damper 30 may be any suitable damper type, including, without limitation: a spring damper, a tuned-mass damper, a viscous fluid damper, or combinations thereof. The outer mass 32 represents one of the working components of any type of damper 30 configured to damp vibrations, and the inner hub 34 represents the connecting structure for any type of damper 30 configured to damp vibrations.

In the specific example of the damper 30 illustrated, there is also an outer hub 38, which annularly surrounds the prop flange 22. The inner hub 34 radially connects the prop flange 22 to the outer hub 38 and the outer mass 32 annularly surrounds the outer hub 38. The damper 30 shown also includes a rubber ring 36 mating or joining the outer mass 32 to the outer hub 38. Note that, as shown in the figures, the rubber ring 36 may not be continuous between the outer mass 32 and the inner hub 34. The rubber ring 36 allows some relative movement between the outer mass 32 and the inner hub 34 and outer hub 38.

The propshaft assembly 10 shown has a plurality of bolt holes 42 formed through at least the prop flange 22 and the axle flange 26. A plurality of bolts (the general location of one of which is illustrated in phantom in FIG. 1) are located within the bolt holes 42, and fixedly attach the prop flange 22 to the axle flange 26. Note however, that the bolts need not attach or fix the damper 30 to either the axle flange 26 or the prop flange 22 because the damper 30 is pressed onto the prop flange 22.

The propshaft assembly 10 shown also includes a plurality of access holes 44. The access holes 44 are optional and may be formed through the inner hub 34 of the damper 30, and provide access to the propshaft 20 and the prop flange 22 through the inner hub 34 of the damper 30. FIG. 1 illustrates the access holes 44 and FIG. 2 illustrates the inner hub 34 without the access holes 44 formed therein. The access holes 44 allow balancing of the propshaft assembly 10, such as by welding or otherwise attaching balance weights to the propshaft 20 or the prop flange 22. Alternatively, the access holes 44 may be threaded, such that balance weights of various sizes may be selectively placed within the access holes 44.

Note that because the damper 30 is pressed onto the prop flange 22, the bolt holes 42 may also provide access to the propshaft 20 and the prop flange 22 through the inner hub 34 of the damper 30 until the axle flange 26 is attached. Therefore, the propshaft 20 and damper 30 may be balanced as an assembly through the bolt holes 42 without the need for the access holes 44.

In addition to removing one loose component, the damper 30, from the final assembly processes, the propshaft assembly 10 may provide improved balance. The access holes 44, combined with the press-fit attachment of the damper 30 to the propshaft assembly 10, allows the propshaft assembly 10 to be balanced after it is fully assembled, as opposed to being balanced and then having the damper 30 attached.

Referring now to FIG. 3, and with continued reference to FIGS. 1-2, there is shown a propshaft assembly 110. Several components of the propshaft assembly 10 are shared with, or very similar to, the propshaft assembly 110 and, as such, similar components may not be described with reference to FIG. 3.

In the propshaft assembly 110, a prop flange 122 transfers torque and power to an axle flange 126. A damper 130 is pressed onto the prop flange 122 prior to assembly with the axle flange 126.

In the propshaft assembly 10 shown in FIG. 1, the whole damper 30 is attached to the prop flange 22 when the inner hub 34 is pressed directly onto the flange pilot 28. However, in the propshaft assembly 110, the prop flange 122 is formed integrally, as a single piece or single component, with an inner hub 134 and outer hub 138 of the damper 130. The one-piece component of the prop flange 122, inner hub 134, and outer hub 138 may be formed by, for example and without limitation, casting or billet machining. The combined structure essentially makes the inner hub 134 and the outer hub 138 a part of the prop flange 122 and allows the remainder of the damper 130 to be press-fit thereto. Therefore, a rubber ring 136 and an outer mass 132 are pressed directly onto the outer hub 138.

After the damper 130 is press fit to the prop flange 122, the propshaft 120 and the damper 130 may be balanced together. Weights may be welded, or otherwise attached, to any of the propshaft 120, the prop flange 122, or the damper 130 via one or more bolt holes 142, which may provide access to the interior of the damper 130 or the propshaft 120 until bolts are used to attach the axle flange 126.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A propshaft assembly, comprising:
an axle flange;
a propshaft having;
   a prop flange mated to the axle flange for common rotation therewith; and
   a flange pilot formed on the prop flange and configured to align the prop flange to the axle flange; and
a damper having an outer mass annularly surrounding the prop flange, wherein the damper is press-fit onto one of the prop flange and the flange pilot, such that the damper is attached directly to the propshaft for common rotation therewith.

2. The propshaft assembly of claim 1, further comprising:
a plurality of bolt holes formed through the prop flange and the axle flange; and
a plurality of bolts located within the bolt holes and fixedly attaching the prop flange to the axle flange.

3. The propshaft assembly of claim 2, wherein the damper further includes:
an outer hub annularly surrounding the prop flange;
an inner hub radially connecting the prop flange to the outer hub; and
a rubber ring mating the outer mass to the outer hub.

4. The propshaft assembly of claim 3,
wherein the outer hub, the inner hub, and the prop flange are formed in one piece as an integral, single component, and
wherein the rubber ring is pressed onto the outer hub of the integral, single component.

5. The propshaft assembly of claim 4, further comprising:
a plurality of access holes formed through the inner hub of the damper, wherein the access holes provide access to the propshaft from outside of the damper.

6. A propshaft assembly, comprising:
an axle flange rotatable about an axis;
a propshaft having;
   an input shaft;
   a universal joint mated to the input shaft;
   a prop flange mated to the input shaft via the universal joint, such that the universal joint is configured to allow an offset angle between the input shaft and the axis, wherein the prop flange is directly mated to the axle flange for common rotation about the axis; and
   a flange pilot formed on the prop flange and configured to radially and axially align the prop flange to the axle flange; and
a damper having an outer mass annularly surrounding the prop flange, wherein the damper is press-fit onto one of the prop flange and the flange pilot, such that the damper is attached directly to the propshaft for common rotation therewith.

7. The propshaft assembly of claim 6, wherein the damper further includes:
   an outer hub annularly surrounding the prop flange;
   an inner hub radially connecting the prop flange to the outer hub; and
   a rubber ring mating the outer mass to the outer hub.

8. The propshaft assembly of claim 7, wherein a portion the inner hub is sandwiched between the prop flange and the axle flange.

9. A propshaft assembly, comprising:
an axle flange rotatable about an axis;
a propshaft having;
   an input shaft;
   a universal joint mated to the input shaft;
   a prop flange mated to the input shaft via the universal joint, such that the universal joint is configured to allow an offset angle between the input shaft and the axis, wherein the prop flange is directly mated to the axle flange for common rotation about the axis; and
   a flange pilot formed on the prop flange and configured to radially and axially align the prop flange to the axle flange; and
a damper having:
   an outer mass annularly surrounding the prop flange;
   an outer hub annularly surrounding the prop flange;
   an inner hub radially connecting the prop flange to the outer hub, such that the damper is attached directly to the propshaft; and
   a rubber ring mating the outer mass to the outer hub,
   wherein a portion the inner hub contacts the axle flange,
   wherein the outer hub, the inner hub, and the prop flange are formed in one piece as an integral, single component, and
   wherein the rubber ring is pressed onto the outer hub of the integral, single component.

10. The propshaft assembly of claim 9, further comprising:
a plurality of access holes formed through the inner hub of the damper, wherein the access holes provide access to the propshaft from outside of the damper.

\* \* \* \* \*